March 31, 1970   J. R. CLARKSON   3,503,416
VALVE ASSEMBLY

Filed Jan. 15, 1968   4 Sheets-Sheet 3

INVENTOR.
John R. Clarkson
BY
Strauch, Nolan, Neale, Nies & Kurz
ATTORNEYS

March 31, 1970   J. R. CLARKSON   3,503,416
VALVE ASSEMBLY

Filed Jan. 15, 1968   4 Sheets-Sheet 4

INVENTOR.
John R. Clarkson
BY
Strauch, Nolan, Neale, New & Kurz
ATTORNEYS

United States Patent Office 3,503,416
Patented Mar. 31, 1970

3,503,416
VALVE ASSEMBLY
John Robert Clarkson, Palo Alto, Calif., assignor to The
J. R. Clarkson Company, Palo Alto, Calif., a corporation of California
Filed Jan. 15, 1968, Ser. No. 697,688
Int. Cl. F16k 1/12, 1/42, 21/04
U.S. Cl. 137—375          11 Claims

ABSTRACT OF THE DISCLOSURE

A valve assembly mounted over a lateral opening in a conduit comprises a body secured to the conduit by flexible metal straps and having the inlet end adapted to the shape of the conduit by an interposed saddle block, there being a rubber valve seat at the inlet end against which seats a rubber covered reciprocable valve element operated by an external lever system, with the interior of the body being rubber lined around the seat and valve element region and the valve element being urged toward closed position by an axially compressed rubber sleeve surrounding the stem of the valve element.

BACKGROUND, FIELD AND SUMMARY OF INVENTION

The invention relates to a unitary valve assembly readily attached over a side opening in a conduit, with novel adapter arrangements for interfitting it with the conduit and with novel internal rubber seat and passage lining structure for resisting corrosion and/or abrasion by fluent material extracted from the conduit.

In its preferred embodiment the valve assembly is used as an on/off valve for extracting a slurry, pulp or the like from a conduit involved in a mining or mineral refining process such as a copper concentration system where the service is unusually severe. The problem has been known and attempts have been made to solve it. Ordinary metal valves soon become corroded, and particles lodge in the seats causing them to leak in closed condition. So-called pinch valves have been proposed wherein a flexible valve body section is reduced in effective diameter, but the constant exposure to flowing slurry often wears these valves quickly. The rubber lining of valve heads and seats for corrosion protection has been proposed as in Hagen Patent No. 1,923,306 and while valves of this type have merit the valve assembly of the invention represents improvement thereover chiefly in the following respects:

(1) The valve of the invention is a specially constructed steel body containing readily replaceable massive abrasion resistant rubber or other elastomeric valve seat and body linings.

(2) The valve head is reciprocable and lever operated for speedy on/off operation as handling ore mill tailings and the stem is surrounded by a readily replaceable sealing sleeve of rubber that functions as a closing spring.

(3) The inlet end of the valve assembly is connected to the conduit opening by a special saddle block arrangement that automatically adapts the valve body end to solid mounting on the cylindrical side of the conduit.

(4) A simple compact strap arrangement clamps the valve assembly quickly to the conduit from which material is to be extracted.

The foregoing are all objects of the invention.

PREFERRED EMBODIMENT

Figure 1:
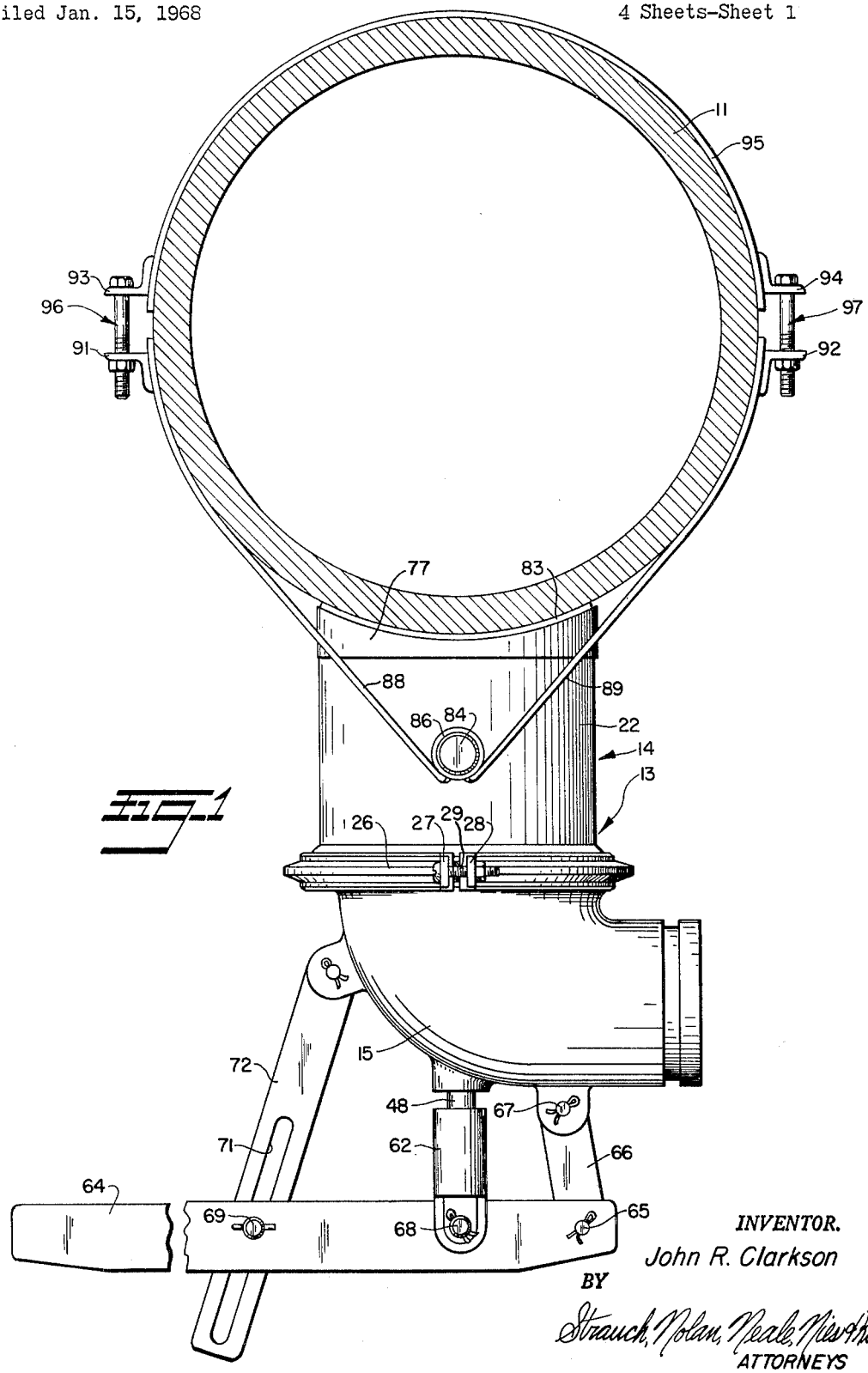
FIGURE 1 is an end elevation partly in section showing a preferred embodiment of the invention.
Figure 2:
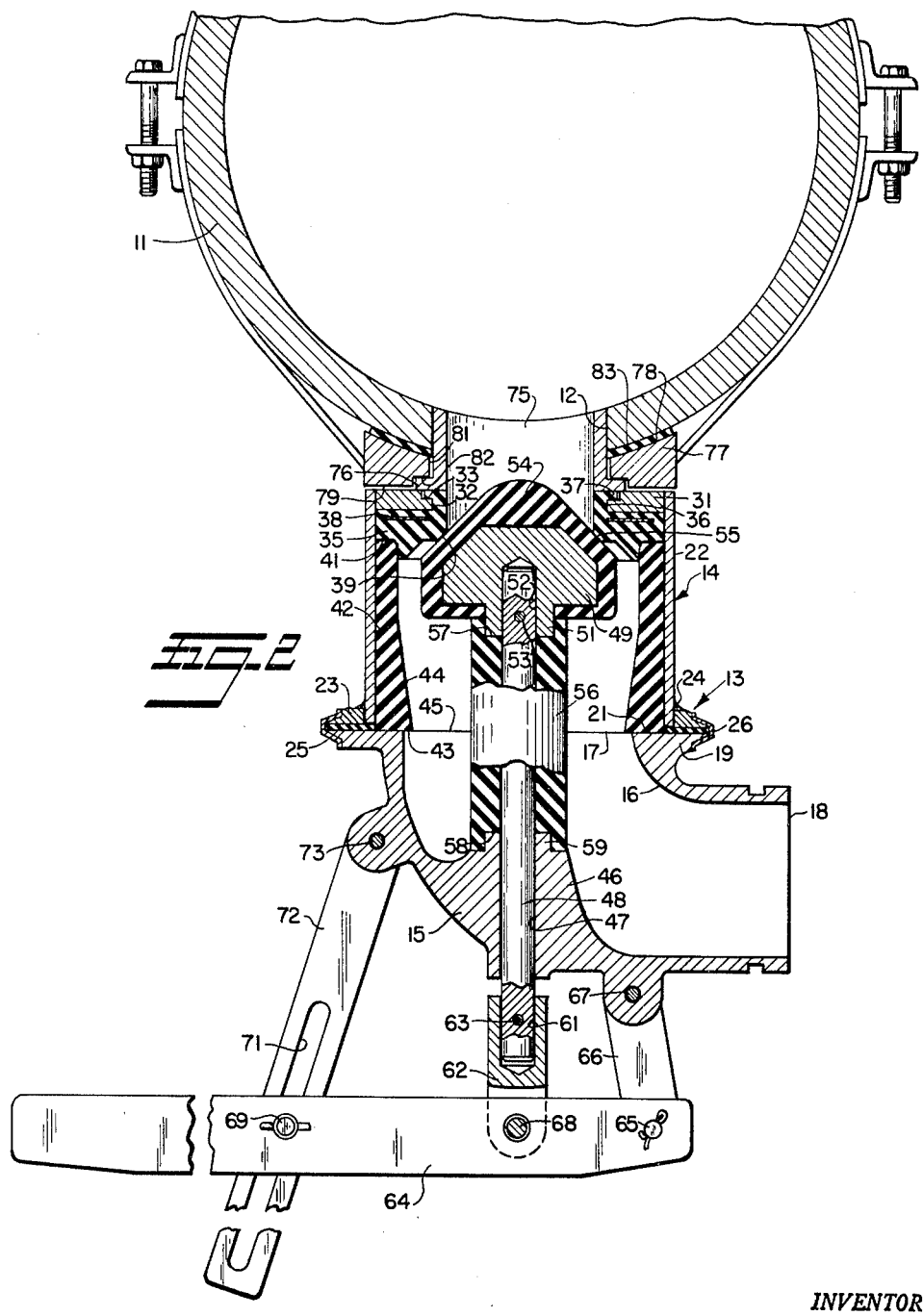
FIGURE 2 is a mainly sectional end view showing the valve and associated passage assembly attached to a conduit, the valve being illustrated in closed position.
Figure 3:
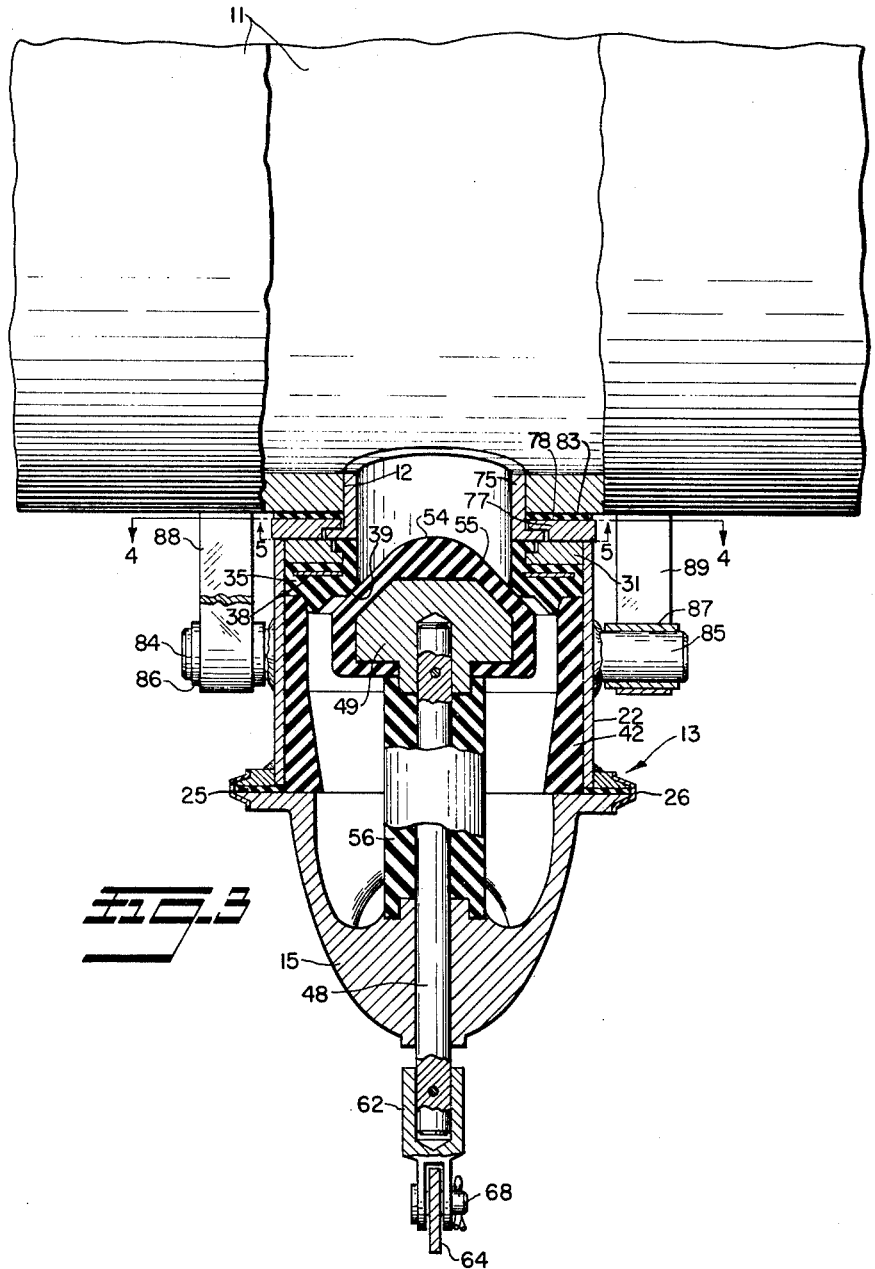
FIGURE 3 is a mainly sectional side view taken at right angles to that of FIGURE 2 showing further details of structure between valve and the conduit.
Figure 4:
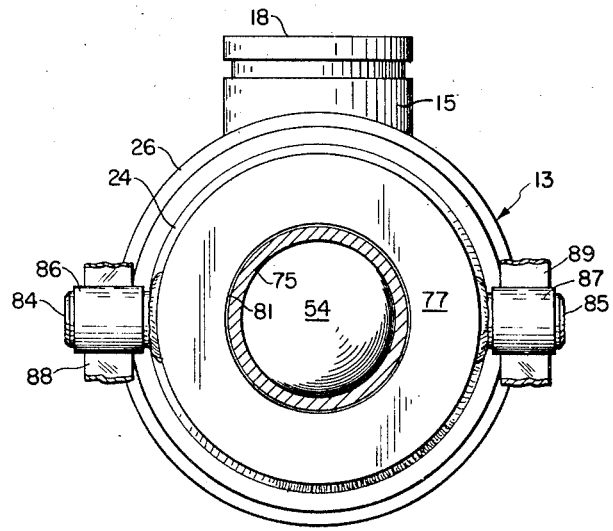
FIGURE 4 is a fragmentary section taken substantially on line 4—4 of FIGURE 3.
Figure 5:
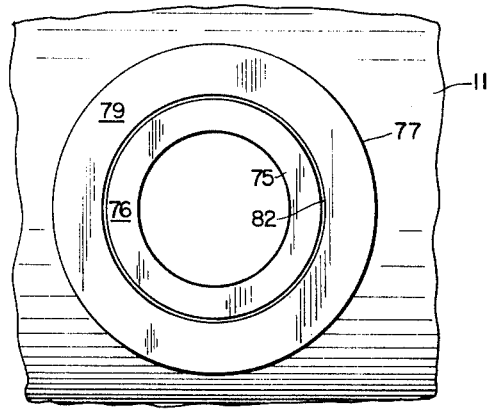
FIGURE 5 is a fragmentary section taken substantially on line 5—5 of FIGURE 3.

Referring to FIGURES 1–3, the conduit 11 is formed with a bottom wall opening 12 to which is applied a novel valve and associated passage defining structure 13 according to the invention.

Conduit 11 is for example any suitably large conduit for conveying fluent material which may be corrosive or an abrasive slurry. The invention provides for the ready speedy attachment of a valve and passage defining assembly to an aperture cut at a desired place in the conduit wall, as for selectively draining some of the fluent material from the conduit, and the assembly is made substantially resistant to corrosion and abrasion.

Assembly 13 comprising a body 14 having a rigid cast steel portion 15 defining a passage 16 that turns smoothly through 90° from an inlet opening 17 to an outlet opening 18. In some embodiments the passage through body portion 15 may be at 45° with respect to the inlet axis. Any suitable takeaway pipe or conduit may be attached to body portion 15 at opening 18. Opening 17 is surrounded by a radial external flange 19 having a smooth annular face 21.

Body 14 is essentially completed by mounting a cylindrical steel portion 22 upon flange 19 in alignment with opening 17. Preferably cylinder 22 is fabricated from a suitable sheet steel, and a rigid annular steel ring flange 23 closely surrounds an end thereof so as to be coextensive with the outer part flange 19. Ring flange 23 is welded to cylinder 22 as at 24.

A gasket 25 of resilient corrosion resistant material, such as rubber, extends between the external flanges 19 and 23. At their peripherally outer ends, flanges 19 and 23 are reduced in thickness and enclosed by a suitably formed clamp strap ring 26 which as shown in FIGURE 1 has opposite end lugs 27 and 28 through which pass a bolt assembly 29. When the bolt 29 is drawn tight, clamp ring 26 is pulled tightly around the flanges which are urged together to clamp gasket 25 between them to provide a fluid tight joint between the body portions 15 and 22.

At is end opposite flange 23, body portion 22 is provided with a rigid internal radial flange 31 which may be a solid steel ring peripherally welded within cylinder 22. Flange 31 defines an internal opening 32, and a countersunk shoulder 33 is formed around an end of opening 32.

A resilient annulus 35 of solid rubber is mounted on flange 31 and closely confined within body portion 22 to serve as a resilient valve seat. Seat 35 is formed with an external annular mounting groove 36 which fits over the internal periphery of flange 31 and provides a resilient annular end lip 37 extending over shoulder 33. Valve seat 35 is stiffened against longitudinal bending by incorporation as by molding therein of an annular flat steel spring ring insert 38. Insert 38 is axially aligned with the flange 31. Axially inwardly of its mounting on flange 37, seat 35 is formed with an annular inclined seating surface 39.

Seat ring 35 is formed with an inwardly facing annular shoulder recess 41, and a cylindrical body liner sleeve 42 of rubber is provided in close conformity with the interior of cylinder 22 with its upper end extending into recess 41 for radial compression between the seat ring 35 and the metal body portion. The other end of sleeve 42 is a flat surface 43 adapted to seat tightly on the smooth inner annular surface 21 of body flange 19. Sleeve 42 has an inner end section of increasing thickness providing a tapering passage defining surface 44 the end edge 45 of which is disposed radially inwardly of flange surface 21.

Internally body portion 15 is formed with an integral boss 46 having a through bore 47 slidably mounting a valve stem 48. A rigid metal valve head core 49 is formed with a projecting boss 51 surrounding a central bore 52 into which extends the end of stem 48. A fastener such as pin 53 passing through boss 51 secures core 49 to stem 48. The entire valve head core except for a projecting end of boss 51 has a molded rubber resilient outer covering 54. As illustrated the composite valve head has a substantially conical resilient seating surface 55 disposed at the same angle as seating surface 39 which it contacts and presses against over an appreciable annular area in the closed position.

An annular cylindrical sleeve 56 of rubber or like resilient material surrounds stem 48 with its recessed ends 57 and 58 fitting snugly over head core boss 51 and a reduced diameter section 59 of boss 46. FIGURE 1 shows the valve closed condition, wherein sleeve 56 is under some axial compression with one end pressing against the valve head so as to provide a substantially continuous rubber covering of the valve head and stem metal surfaces within the valve body. The other end of sleeve 56 presses sealingly against boss 46.

The outer end of valve stem 48 extends into a bore 61 in a clevis 62 where it is secured by a pin 63. An operating lever 64 is pivoted at one end at 65 on a link 66 which in turn is pivoted on the body at 67. Lever 64 is pivotally connected to the valve stem at 68, so that manual downward rocking of lever 64 about its pivot 65 in FIGURE 2 will result in displacement of the valve head to valve open position.

Downward displacement of stem 48 will result in further axial compression of sleeve 56 which in this respect functions as resilient spring means tending to urge the valve head toward the closed condition of FIGURE 2.

Near its outer end lever 64 carries a releasable fastener such as a wing nut unit 69 slidably extending into a slot 71 on a link 72 pivoted on the body at 72, whereby lever 64 may be secured to link 72 to selectively lock the valve head in either open or closed positions.

A metal sleeve insert 75 is mounted with the conduit opening 12, preferably with a force fit. Sleeve 75 is preferably made of some corrosion and abrasion resistant metal alloy, and it has an external radial end flange 76.

A saddle block 77 is interposed as an adapter between the conduit 11 and valve body 14. Block 77 has a concave cylindrical surface 78 facing the conduit and a flat surface 79 facing the valve body, and it is formed with a central opening 81 surrounding insert sleeve 75 and a shoulder recess 82 into which seats the insert sleeve flange 76. An annular resilient seal gasket 83 is disposed between concave surface 78 and the conduit wall around opening 12.

Referring to FIGURES 1 and 3, diametrically opposite cylindrical posts 84 and 85 are secured as by welding to body portion 22. Cylindrical thimbles 86 and 87 are rotatably mounted on the respective posts. As shown in FIGURE 1, thimble 86 has flexible metal strap sections 88 and 89 secured thereto as by welding. The other ends of strap sections 88 and 89 extend flexibly into contact with and along the surface of conduit 11 to terminate in fastener clips 91 and 92 respectively which are attached to fastener clips 93 and 94 on opposite ends of another flexible metal strap section 95 extending around the conduit surface by bolt and nut assemblies 96 and 97. A similar flexible strap arrangement is provided at thimble 87.

When bolt and nut assemblies 96 and 97 are drawn tight, the entire valve body 13 is pulled into fluid tight mounted assembly with conduit 11. Gasket 83 is compressed to seal the joint between conduit opening 12 and the saddle block 77. Flat surfaced flange 76 is clamped axially between end flange 31 of the valve body and saddle block 77, and the upper end of valve seat 35 is resiliently compressed between the insert flange 76 and body flange 31 to form a fluid tight seal.

Thus the entire valve body assembly including the valve and its operating lever system is speedily and readily secured in fluid tight relation upon conduit 11 without the need of special skills or tools. Once the assembly is installed on conduit 11, lever 64 may be operated to open or close the valve, opening movement of the valve compressing sleeve spring 56 which thus always biases the valve toward closed position as a fail safe condition.

The valve seat, the valve head and stem and the interior of the valve body in the neighborhood of the stem are all massively rubber covered to reduce wear arising from corrosion or erosion by abrasive particles at the areas of greatest turbulence and velocity within the valve body, and these rubber parts are readily replaceable. Since the rubber linings and coverings are static parts they do not assume permanent set when closed over long periods, as do many pinch valves.

What is claimed and desired to be secured by Letters Patent is:

1. A valve assembly comprising a body having a through passage extending between inlet and outlet openings, an annular resilient valve seat member in said passage, a valve element having a head covered with resilient material reciprocable within said body and adapted to engage said seat in valve closed position, a stem on which said valve element is mounted extending slidably through said body, a resilient sleeve surrounding said stem and axially compressed between the body and said valve element head in all positions of said stem and said valve element whereby said valve element and that portion of the stem within said passage are protectively enclosed by resilient material in all operative positions of said valve element, a resilient annulus lining said body inwardly of said seat member and disposed in surrounding relation to said valve element and said sleeve, and external lever means on said body operably connected to said stem.

2. The valve assembly defined in claim 1, wherein said seat member, body lining annulus and sleeve are separate removable and replaceable integral parts.

3. In the valve assembly defined in claim 1, said body having an internal annular flange adjacent said inlet and said valve seat member having an external groove fitted over said flange and an internal substantially annular stiffening element axially aligned with said flange.

4. In the valve assembly defined in claim 1, said valve seat element being an annulus of rubber axially anchored on said body adjacent the inlet opening and said body liner being a separate thick annular rubber body having an end sealingly interlocked in axial abutment with said seat member.

5. In the valve assembly defined in claim 1, said resilient annulus surrounding the stem being a rubber sleeve recessed at opposite ends to interfit with rigid bosses on the valve element and the valve body, and said sleeve having end abutment with the resilient covering of said valve element.

6. In the valve assembly defined in claim 1, said lever assembly comprising a pivoted actuating lever pivotally connected to said stem and means for selectively locking said lever to the body.

7. In the valve assembly defined in claim 1, said valve body comprising a fabricated sheet metal portion within which are mounted said valve seat member and said body liner, and a relatively rigid portion defining an angularly related passage section on which said valve stem is slidably mounted.

8. A valve assembly of the type adapted for mounting over a lateral opening in a conduit and comprising a body having inlet and outlet openings and means for securing the valve body upon the conduit, characterized by an apertured adapter member shaped on opposite sides to the contour of said body inlet and the conduit outer surface around said opening interposed between the valve body and the conduit, a rigid sleeve disposed within the conduit opening, a radial flange on said sleeve clamped between said adapted member and the adjacent end of said valve body, and flexible strap means attached to said body and secured around said conduit.

9. The valve assembly defined in claim 8 wherein opposed rigid posts are provided projecting laterally from said body and said strap means is pivoted on said posts.

10. The valve assembly defined in claim 8 wherein a resilient annular valve seat member is mounted within the body at said inlet opening in end abutment with said sleeve flange when said strap means is drawn tight.

11. A valve assembly of the type adapted for mounting over a lateral opening in a conduit and comprising a body having inlet and outlet openings and means for securing the valve body upon the conduit, characterized by a rigid apertured saddle block having on one side a concave surface matching the conduit outer surface around said lateral opening interposed between the valve body and the conduit, rigid annular means interposed between said body and said saddle block, an annular resilient valve seat having an annular portion thereof compressed between said body and said saddle block, and flexible strap means attached to said body and secured around said conduit.

References Cited

UNITED STATES PATENTS

| 1,129,215 | 2/1915 | McLaren | 251—114 |
| 1,947,257 | 2/1934 | Fritz et al. | 251—361 X |
| 2,181,900 | 12/1939 | Langdon | 137—93 |
| 2,360,603 | 10/1944 | Ward | 251—246 X |
| 2,699,801 | 1/1955 | Schleyer | 251—368 X |

FOREIGN PATENTS 923,762  2/1955  Germany.

M. CARY NELSON, Primary Examiner

WILLIAM R. CLINE, Assistant Examiner

U.S. Cl. X.R.

251—146, 246